May 13, 1941.  G. G. WITTWER ET AL  2,242,099
ANT TRAP
Filed July 13, 1939
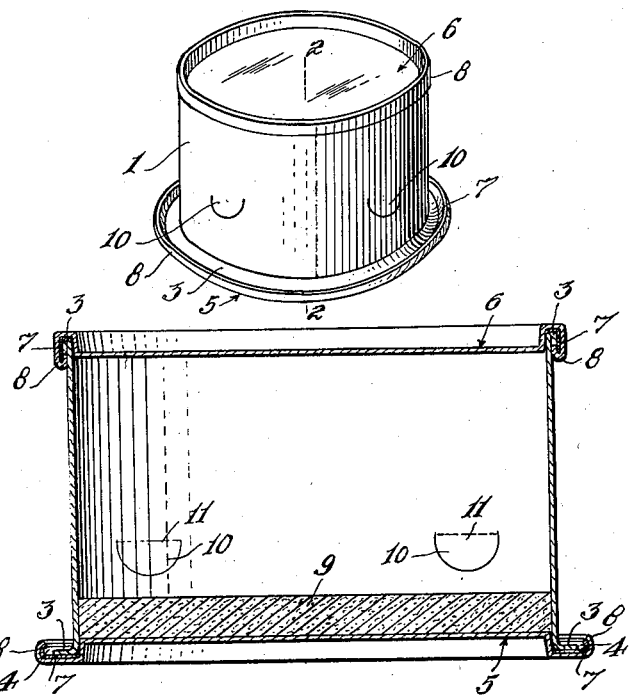
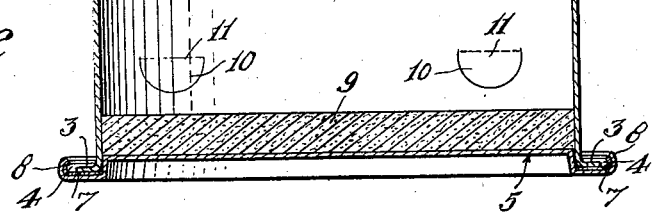
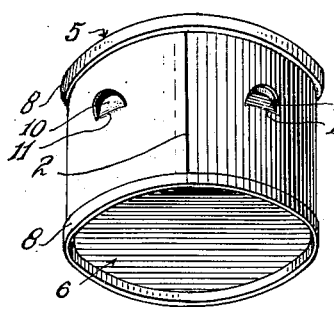
INVENTORS
George G. Wittwer.
William M. Stjeh
BY
A. D. T. Libby
ATTORNEY Patented May 13, 1941

2,242,099

UNITED STATES PATENT OFFICE 2,242,099

ANT TRAP

George G. Wittwer, Chappaqua, N. Y., and William M. Stieh, Teaneck, N. J., assignors to Lethelin Products Co., Inc., Mount Vernon, N. Y., a corporation of New York Application July 13, 1939, Serial No. 285,049

1 Claim. (Cl. 43—131)

This invention relates to a device for holding bait for killing insects such as ants, roaches and the like.

One of the objects of the invention is to provide an ant trap which is so constructed that it will stand a tremendous amount of rough handling or abuse, without the parts becoming displaced or disassembled, so that after the trap has been assembled with the insect bait or poison within the trap and the same hermetically sealed during the assembly operation, no material will escape from the trap during packing, shipping, storage or handling. Furthermore, the trap is so constructed that children cannot get into it, and neither can animals, such as dogs and cats. Consequently the chances of any person or animal being poisoned by the material are substantially nil.

Another object of our invention is to provide an ant trap which is so constructed that openings can be made in the side wall of the trap only by the use of considerable force, thus preventing these openings from being made by children.

Another object of our invention is to provide an ant trap which is neat and artistic in design, thereby aiding in the sale of the trap and the material contained therein.

These and other objects will appear on reading the specification taken in connection with the annexed drawing, wherein:

Figure 1 is a perspective view of the trap in its normal upright position, but just before the bottom cover plate is anchored into position.

Figure 2 is a sectional view on an enlarged scale on the line 2—2 of Figure 1.

Figure 3 is a perspective view of the complete, assembled trap shown in reverse position from that of Figure 1, and with two of the scorings on the side wall of the trap displaced inwardly so that the insects may enter the trap.

In the different views, 1 is a metallic ring or band made of a piece of thin sheet metal of suitable material, the two ends of the band being brought together and welded or soldered along the line 2. The two edges are formed outwardly at 3 and these annular flanges are adapted to set into peripheral recesses 4 formed at the outer edge of each of the end plates 5 and 6. Before assembling the end plates 5 and 6 to the band 1, the recesses 4 are provided with a suitable type of gasket or washer 7, preferably of "latex."

After one of the end plates, for example 5, has been assembled to the band by forcing or spinning over the edge 8 into the position shown in the top portions of Figures 1 and 2, the bait 9 is put into the cup. For ants we prefer to use a material such as disclosed in Hamilton Patent 1,989,981 as we have found this a most efficient bait for ants and one which will not readily flow under ordinary temperatures. However, it is to be understood that other bait may be used for ants, roaches or other insects.

After the insect bait has been placed in the cup, then the other end plate, 6 for example, is put into position as shown for the plate 5, and the edge 8 turned over into final position as shown in Figure 3.

The band 1 is provided with a plurality of scorings 10 arcuately spaced around the band and a distance from the bottom end plate 5 so that the ants may readily get into the trap after the surface bounded by the scoring line 10 has been pushed inwardly along a line represented by the dotted line 11. These scorings are made so that it requires considerable force to break the material away and therefore there is no danger of their being accidentally knocked out of position or displaced by children. After the material has been broken away, it may be bent inwardly toward the top plate 6, allowing free access into the trap by the insects. The scorings are placed relatively low on the band 1, toward the bottom plate 5, and the amount of bait that is put in is such as to take its position below the scorings.

The width of the band 1 is made such that all the instructions for use in handling the trap and material may be applied thereto, the top plate 6 being reserved for the trade name and other indicia. Hence the plate 6 has been referred to as the top plate. With this arrangement of the designations on the trap, it will be obvious to the user that the plate 6 is the top and the trap will be placed with the plate 5 on the shelf or other support.

In the manufacture of this trap, we prefer to use a lead-coated steel plate known in the trade as "Terne" plate, as this will not rust, in contradistinction to tin which does readily rust and taints the material so that ants will not eat it. Furthermore, a tin cup or trap, when it starts to rust, will leave a mark on the shelf or spot on which it is placed, which may be objectionable under certain circumstances, but a trap made of the material above specified, is not open to this objection.

By reason of the construction herein described, we have obtained a very highly satisfactory insect trap, especially for ants.

What we claim is:

A substantially non-collapsible insect trap composed of a bottom, an inclosing side wall, and a top, all of lead-coated sheet metal and sealed together, the bottom having a poison material on the upper inner surface thereof and in contact with the side wall throughout its extent, the side wall having one or more scorings therein intermediate the top and bottom adapted to be forced inwardly upon the application of force so as to provide an entry into the enclosure and the lower portion of the scorings being so positioned with respect to the poison material, that an insect entering the opening can readily position itself on the poison without necessarily contacting the interior surface of the enclosing wall.

GEORGE G. WITTWER.
WILLIAM M. STIEH.